under 35 U.S.C. 154(b) by 1293 days.

United States Patent
Kim

(10) Patent No.: US 8,670,391 B2
(45) Date of Patent: Mar. 11, 2014

(54) CHANNEL ALLOCATION METHOD FOR ASYNCHRONOUS MOBILE COMMUNICATION SYSTEM

(75) Inventor: Young-Lak Kim, Yongin-si (KR)

(73) Assignee: SK Telecom Co., Ltd., Seoul (KR)

( * ) Notice: Subject to any disclaimer, the term of this patent is extended or adjusted under 35 U.S.C. 154(b) by 1293 days.

(21) Appl. No.: 11/579,469

(22) PCT Filed: Apr. 28, 2005

(86) PCT No.: PCT/KR2005/001232
§ 371 (c)(1),
(2), (4) Date: Sep. 29, 2008

(87) PCT Pub. No.: WO2005/109686
PCT Pub. Date: Nov. 17, 2005

(65) Prior Publication Data
US 2009/0016276 A1   Jan. 15, 2009

(30) Foreign Application Priority Data
May 6, 2004   (KR) .................. 10-2004-0031629

(51) Int. Cl.
*H04W 4/00*   (2009.01)
(52) U.S. Cl.
USPC .......................................... 370/329; 370/341
(58) Field of Classification Search
USPC ................... 370/218, 329, 335, 341
See application file for complete search history.

(56) References Cited

U.S. PATENT DOCUMENTS

| | | | |
|---|---|---|---|
| 6,445,917 B1 * | 9/2002 | Bark et al. ................. | 455/423 |
| 2002/0128014 A1 | 9/2002 | Chen | |
| 2003/0227897 A1 | 12/2003 | Okada | |
| 2004/0110521 A1 * | 6/2004 | Soldani et al. ............. | 455/509 |
| 2004/0255285 A1 * | 12/2004 | Fisher ........................ | 717/151 |

FOREIGN PATENT DOCUMENTS

| | | |
|---|---|---|
| EP | 1361769 | 11/2003 |
| EP | 1361769 A1 | 11/2003 |
| JP | 10-013937 | 1/1998 |
| JP | 10-322760 | 12/1998 |
| JP | 2000-224650 | 8/2000 |

(Continued)

OTHER PUBLICATIONS

Korean office action for 10-2004-0031629.

(Continued)

*Primary Examiner* — Noel Beharry
*Assistant Examiner* — Farhad Ali
(74) *Attorney, Agent, or Firm* — Lowe Hauptman & Ham, LLP

(57) ABSTRACT

Disclosed is a channel allocation method for asynchronous mobile communication system for mapping a call between channels equally. The method converts at least a mobile phone connected to a channel having a high loading dose and then connects the mobile phone to a channel having a low loading dose, in case that a difference of a loading dose between channels is greater than a predetermined value after a loading dose of available respective channel is measured in a node B/RNC and a difference of loading doses between available respective channels is calculated in an asynchronous mobile communication system.

5 Claims, 3 Drawing Sheets

(56) References Cited

FOREIGN PATENT DOCUMENTS

| | | |
|---|---|---|
| JP | 2002-159038 | 5/2002 |
| JP | 2003-087855 | 3/2003 |
| JP | 2004-015342 | 1/2004 |
| KR | 1020020036056 | 5/2002 |
| KR | 1020020036056 A | 5/2002 |
| KR | 1020030087567 | 11/2003 |
| WO | 99/39535 | 8/1999 |

OTHER PUBLICATIONS

Japanese office action for 2007-511273.

International Search Report mailed Jul. 29, 2005 for PCT/KR2005/001232.

Indian First Examination Report for 1481/MUMNP/2006 dated Feb. 29, 2012.

* cited by examiner

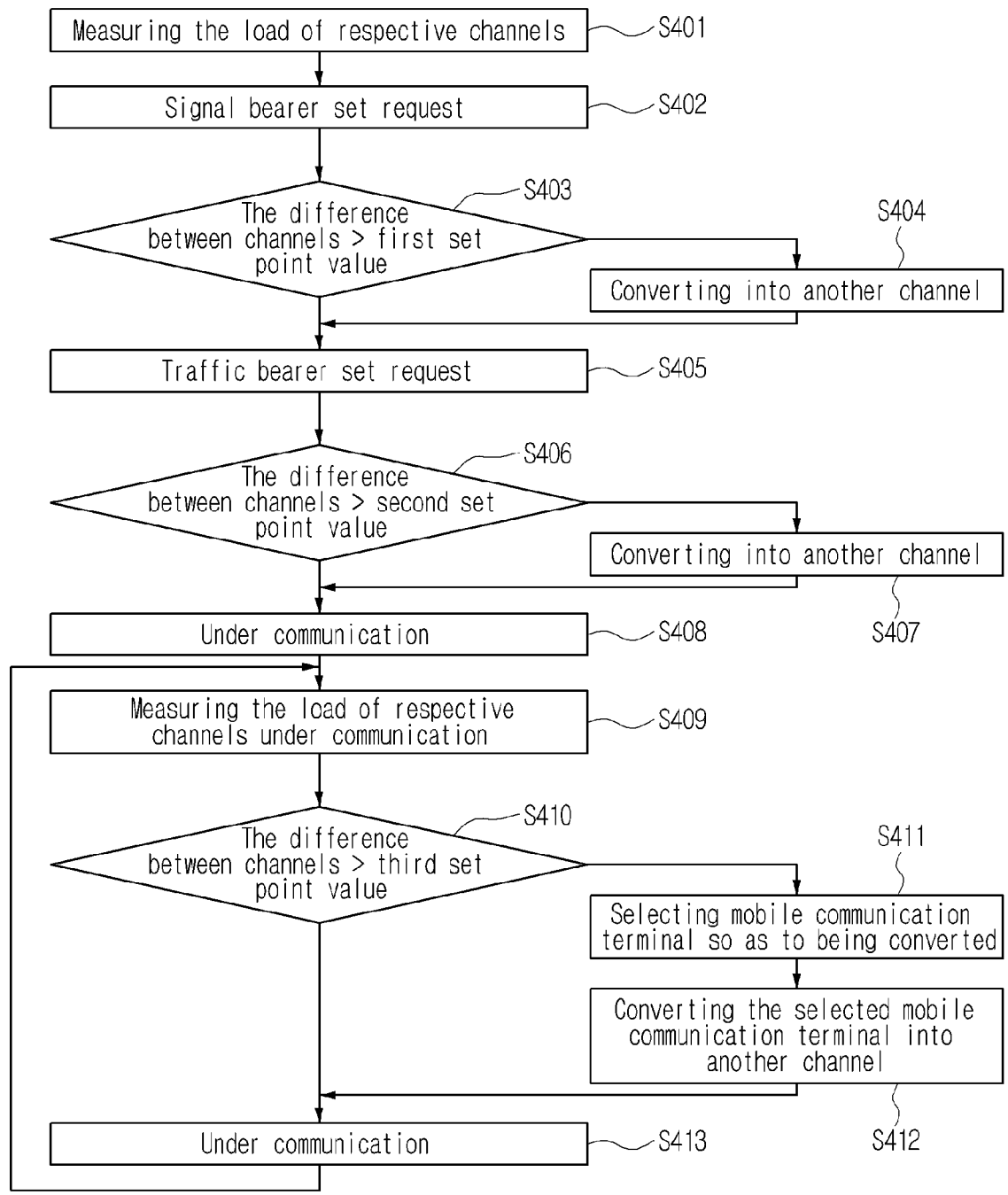

ately attempted through a basic channel. In addition to the basic channel and the second channel, a mobile communication terminal number, a network provider segment number, a connection exchanger number, etc., which are required to process calls, are stored in the NAM. At the time of opening the mobile communication terminal, equivalent values are input by an operator. Herein, when a mobile communication terminal is connected to the mobile communication network, the basic channel information and the second channel information are assigned based on designated criteria
CHANNEL ALLOCATION METHOD FOR ASYNCHRONOUS MOBILE COMMUNICATION SYSTEM

CROSS REFERENCE TO RELATED APPLICATION

This application is the National Phase application of International Application No. PCT/KR2005/001232, filed Apr. 28, 2005, which designates the United States and was published in English. This application, in its entirety, is incorporated herein by reference.

TECHNICAL FIELD

The present invention relates to a channel allocation method in a mobile communication system. More specifically, the present invention relates to a channel allocation method in the asynchronous mobile communication system to uniformly distribute calls to channels.

BACKGROUND ART

A mobile communication system, a third generation asynchronous mobile communication system WCDMA (Wideband CDMA), ensures high service quality and high-speed mobility. Since an enormous investment is required to realize the system, it is not possible to provide a service broadly. Thus, currently, the synchronous mobile communication system (CDMA mobile communication system) that is called second generation or second and half generation coexists.

With the technical development of such mobile communication network, a mobile communication terminal (Multi-Mode Multi-Band Terminal; DBDM mobile communication terminal), which is available for both the synchronous system and the asynchronous system, is developing. By using the mobile communication terminal, different ways of service can be provided in the asynchronous system and in the synchronous system.

In the mobile communication system, when a power source is applied to the mobile communication terminal, the mobile communication terminal selects one frequency band among a plurality of available channels and uses the service. In the synchronous mobile communication system, since the mobile communication terminal selects a certain frequency band by using its own number, it is very rare for the calls to be concentrated into a certain channel.

However, in the asynchronous mobile communication system, since the mobile communication terminal attempts calls to a channel of which the intensity of the receiving signal is higher than others, the distribution of calls among the channels may not be uniform.

Specifically, in case of the synchronous mobile communication system, the primary channel and the secondary channel are stored in the NAM (Number Assignment Module) of a mobile communication terminal. Thereafter, if the power source is applied to the mobile communication terminal, calls are preferentially attempted through a basic channel. In addition to the basic channel and the second channel, a mobile communication terminal number, a network provider segment number, a connection exchanger number, etc., which are required to process calls, are stored in the NAM. At the time of opening the mobile communication terminal, equivalent values are input by an operator. Herein, when a mobile communication terminal is connected to the mobile communication network, the basic channel information and the second channel information are assigned based on designated criteria so as not to be concentrated into a certain channel. According to this process, each mobile communication terminal can always use services through an identical channel in the synchronous mobile communication system.

On the other hand, since the asynchronous mobile communication system has fewer subscribers than the current synchronous mobile communication system, the connection channel is not differentiated per subscribers. In stead, it is connected to the channel having most superior receiving sensitivity when using services.

However, if a number of subscribers, who use the asynchronous mobile communication system, try calls at the same time, the waste of wireless resource gets severe and service quality becomes deteriorated.

FIG. 1 is a conceptual diagram for explaining a channel allocation method for a general asynchronous mobile communication system.

As illustrated, a plurality of mobile communication terminals (10-1~10-n) are connected to the node B/wireless network controller (RNC)(20), and a mobile communication terminal (10-m) is connected to the node B/RNC (20) through a channel 2 (FA2). The mobile communication terminals (10-1~10-n, 10-m) do not try a connection after being assigned with channels to connect with each node, but use services by selecting a channel having the most superior receiving sensitivity (FA1 in FIG. 1) at the initial stage of being applied with power source.

In FIG. 1, EMS (Element Management System) is an operator system to manage a wireless environment in the mobile communication system.

DISCLOSURE OF INVENTION

Technical Problem

If a plurality of mobile communication terminals are connected to a single channel and a minor mobile communication terminal (10-m) is connected to another channel to make the distribution of calls non-uniformly, the load of channel (FA1) becomes heavy to discourage an efficient use of wireless resources and the service quality becomes deteriorated.

Technical Solution

The present invention has conceived in order to resolve the aforesaid problems of the prior arts. The object of the present invention is to provide a channel allocation method in the asynchronous mobile communication system which is capable of effectively managing wireless resources by changing the distribution of calls according to the different load amount among channels and upgrade the service quality.

In order to achieve the aforesaid object, the present invention measures the load of each available channel of the asynchronous mobile communication system; calculates the difference in the load of each available channel; and converts the connection of at least one mobile communication terminals connected to the channel having greater load when the difference in the load is above the predetermined value.

In other words, the load of the channel where a plurality of mobile communication terminals are connected becomes larger than the channel where a few mobile communication terminals are connected and the service quality becomes low. Thus, at least one mobile communication terminals, which are connected to the channel having large load, are converted to the channel having low load.

Advantageous Effects

As stated above, in the asynchronous mobile communication system, in order to avoid load being concentrated to a certain channel by the mobile communication terminal automatically selecting a channel having the most superior receiving sensitivity, the mobile communication terminal connected to the channel having large load is converted to another channel. Therefore, the present invention has the advantage of managing wireless resources efficiently and improving the service quality.

BRIEF DESCRIPTION OF THE DRAWINGS

FIG. 6 is a flow chart for explaining the channel allocation method according to the embodiment 4 of the present invention.

BEST MODE FOR CARRYING OUT THE INVENTION

Hereinafter, the preferred embodiments of the present invention will be explained in detail by reference to the drawings attached hereto. In the following explanation, the mobile communication terminal is desirably a multi-mode, multi-band mobile communication terminal that is available both for the asynchronous mobile communication system and the synchronous mobile communication system.

Figure 1:
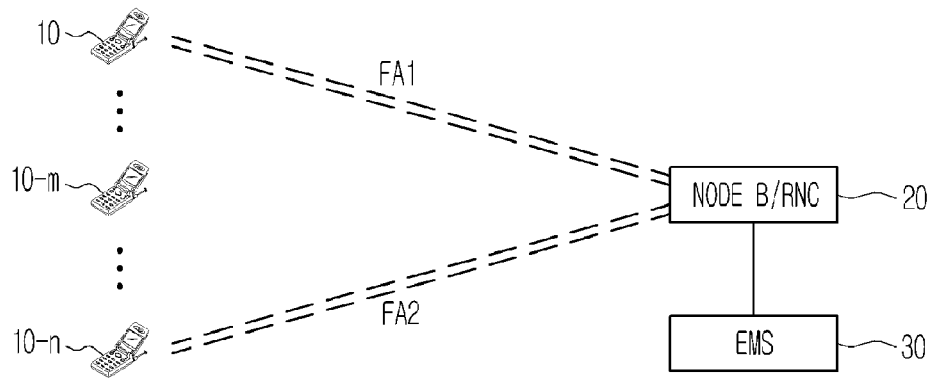
FIG. 1 is a conceptual diagram for explaining a channel allocation method for a general asynchronous mobile communication system.
Figure 2:
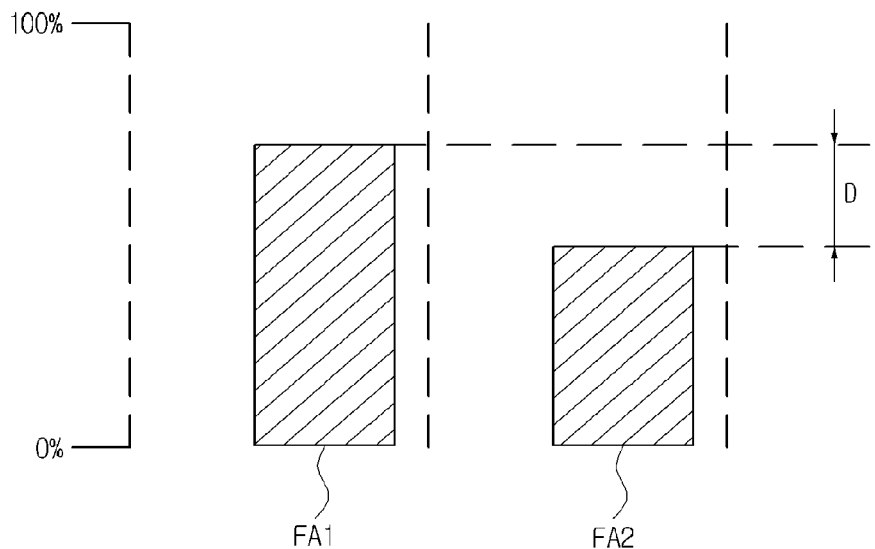
FIG. 2 is a diagram for explaining the method of measuring load per channel in the asynchronous mobile communication system according to the present invention.

FIG. 2 is a diagram for explaining the method of measuring load per channel in the asynchronous mobile communication system according to the present invention. Upon referring to FIG. 1 again, the load of the channel (FA1) where a plurality of mobile communication terminals are connected becomes larger than the channel (FA2) where a few mobile communication terminals are connected and the service quality becomes low. If the difference (D) between the load of each available channel and the two available channels is calculated and becomes more than a set value, the node B/RNC converts the connection of at least one mobile communication terminal connected to the channel (FA1) having large load to the channel (FA2) having low load.

Figure 3:
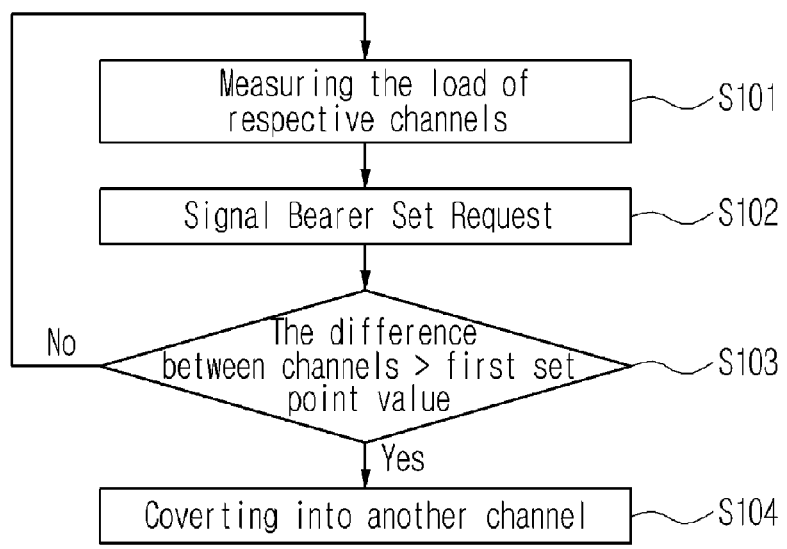
FIG. 3 is a flow chart for explaining the channel allocation method according to the embodiment 1 of the present invention.

FIG. 3 is a flow chart for explaining the channel allocation method according to the embodiment 1 of the present invention, which represents the channel allocation method in case where the mobile communication terminal requires the signal bearer establishment to the asynchronous mobile communication system.

The node B/RNC of the asynchronous mobile communication system periodically measures the load of each available channel and the differences of all the loads between two available channels (S101). In case of a downward link (forward channel), the load of an available channel is measured based on the output power of node B. In case of an upward link (reverse link), the load of an available channel is measured based on the total interference amount.

While the node B/RNC is measuring the load of each available channel and among the available channels, if a signal bearer set request, i.e., a request message for receiving and transmitting control signals, is transmitted from a mobile communication terminal (S102), the node B/RNC checks whether or not the difference in the load between a channel to which a mobile communication terminal requesting a signal bearer set is connected and another channel exceeds the first set point value (S103). If the difference in the load exceeds the first set point value, the node B/RNC converts the connection of a mobile communication terminal, which had requested the signal bearer set, to another channel (S104). Herein, the first set point value is designated by a mobile communication system operator and stored in EMS.

Meanwhile, if the difference in the load between an initially connected channel and another channel is lower than a first set point value, the mobile communication terminal, which has requested the signal bearer set, proceeds to the step of measuring the load of each available channel (S101).

Figure 4:
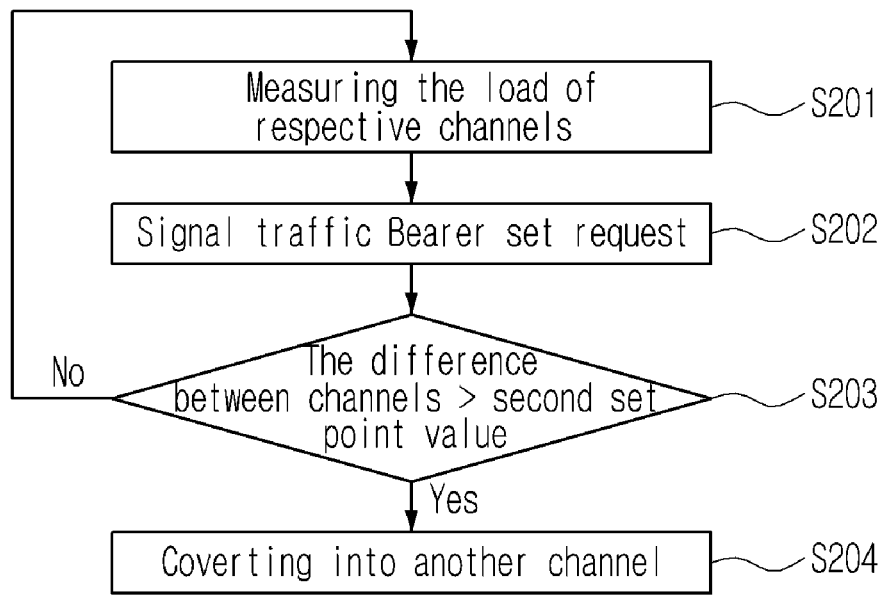
FIG. 4 is a flow chart for explaining the channel allocation method according to the embodiment 2 of the present invention.

FIG. 4 is a flow chart for explaining the channel allocation method according to the embodiment 2 of the present invention, which represents a channel allocation method in case where a mobile communication terminal requests the traffic bearer set to the asynchronous mobile communication system.

The node B/RNC of the asynchronous mobile communication system periodically measures the difference in the load of each available channel and two available channels (S201). In case of a downward link (forward channel), the load of an available channel is measured based on the output power of node B. In case of an upward link (reverse link), the load of an available channel is measured based on the total interference amount.

While the node B/RNC is measuring the load of each available channel and among the available channels, if a signal bearer set request, i.e., a request message for receiving and transmitting control signals, is transmitted from a mobile communication terminal (S202), the node B/RNC checks whether or not the difference in the load between a channel to which a mobile communication terminal requesting a signal bearer set is connected and another channel exceeds the second set point value (S203). If the difference in the load exceeds the second set point value, the node B/RNC converts the connection of a mobile communication terminal, which had requested the traffic bearer set, to another channel (S204). Herein, the second set point value is designated by a mobile communication system operator and stored in EMS.

At this time, the traffic bearer is set differently according to the kind of services. The kind of wireless sources is also different. Thus, the second set point value can be set differently according to the kind of traffic bearer services.

Meanwhile, if the difference in the load between an initially connected channel and another channel is lower than a second set point value, the mobile communication terminal, which has requested the traffic bearer set, proceeds to the next step of measuring the load of each available channel (S301).

Figure 5:
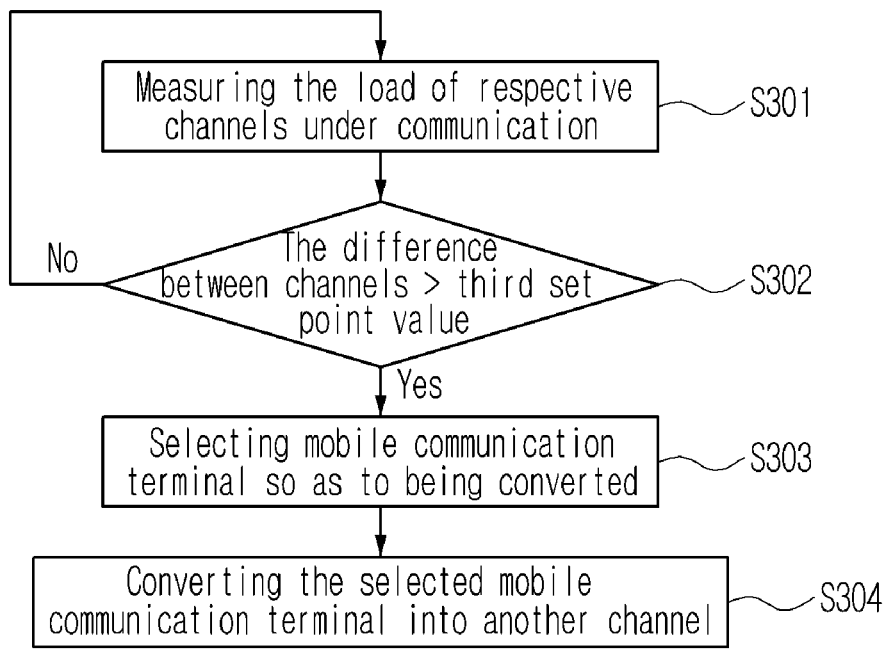
FIG. 5 is a flow chart for explaining the channel allocation method according to the embodiment 3 of the present invention.

FIG. 5 is a flow chart for explaining the channel allocation method according to the embodiment 3 of the present invention. which represents the event where a plurality of mobile communication terminals are in traffic state and the load of the mobile communication terminal, of which the line is busy, is large, the mobile communication terminal having bad service quality is converted to another channel.

The node B/RNC of the asynchronous mobile communication system, which is linked to a plurality of mobile communication terminals and provides voice or data services, periodically measures the difference in the load of each available channel and two available channels (S301). In case of a downward link (forward channel), the load of an available channel is measured based on the output power of node B. In case of an upward link (reverse link), the load of an available channel is measured based on the total interference amount.

The node B/RNC measures the load of each channel and between two channels to ensure whether or not at least one of the different values in the load between the two channels exceeds the third set point value (S302). If there is a different value exceeding the third set point value, the node B/RNC selects at least one mobile communication terminal having bad service quality among a plurality of mobile communication terminals linked to a channel of which the load is large between two channels of which the different value of load exceeds the third set point value (S303), and converts the connection of the selected mobile communication terminal to another channel (S304). Herein, the first set point value is designated by a mobile communication system operator and stored in EMS.

Meanwhile, if the difference in the load between the two channels is lower than a third set point value, the mobile communication terminal proceeds to the next step of measuring the load of each available channel (S301).

Hereinbefore, we explained a channel allocation method in cases where a mobile communication terminal requests a signal bearer set, it requests a traffic bearer set, and if it has a busy line.

This channel allocation method can be applied to the whole process of call set that the mobile communication terminal synchronizes the asynchronization mobile communication system and a control signal by receiving and transmitting the signal, performs traffic set, and transmits a calling state. This process will be described with reference to FIG. 6.

FIG. 6 is a flow chart for explaining the channel allocation method according to the embodiment 4 of the present invention.

The node B/RNC of the asynchronous mobile communication system periodically measures all the differences in the load of each available channel and two available channels (S401). In case of a downward link (forward channel), the load of an available channel is measured based on the output power of node B. In case of an upward link (reverse link), the load of an available channel is measured based on the total interference amount.

While the node B/RNC is measuring the load of each available channel and among the available channels, if a signal bearer set request, i.e., a request message for receiving and transmitting control signals, is transmitted from a mobile communication terminal (S402), the node B/RNC checks whether or not the difference in the load between a channel to which a mobile communication terminal requesting a signal bearer set is connected and another channel exceeds the first set point value (S403). If the difference in the load exceeds the first set point value, the node B/RNC converts the connection of a mobile communication terminal, which had requested the traffic bearer set, to another channel (S404).

Meanwhile, if the difference in the load between the mobile communication terminal and another channel is lower than a first set point value, and after the connection of the mobile communication terminal is converted to another channel at step S404, if the traffic bearer set request, i.e., a request message for receiving and transmitting control signals, is transmitted from the mobile communication terminal (S405), the node B/RNC checks whether or not the difference in the load between the channel to which a mobile communication terminal requesting a signal bearer set is connected and another channel exceeds the second set point value (S406). As a result of checking, if the difference exceeds the second set point value, the mobile communication terminal proceeds to the next step of measuring the load of each available channel (S407).

After the traffic set is completed by above process and the mobile communication terminal is transferred to be in busy line (408), the node B/RNC of the asynchronous mobile communication system periodically measures all the differences in the load of each available channel and two available channels (S409). Likewise, in case of a downward link (forward channel), the load of an available channel is measured based on the output power of node B. In case of an upward link (reverse link), the load of an available channel is measured based on the total interference amount.

The node B/RNC measures the load of each channel and between two channels to ensure whether or not at least one of the different values in the load between the two channels exceeds the third set point value (S410). If there is a different value exceeding the third set point value, the node B/RNC selects at least one mobile communication terminal having bad service quality among a plurality of mobile communication terminals linked to a channel of which the load is large between two channels of which the different value of load exceeds the third set point value (S411), and converts the connection of the selected mobile communication terminal to another channel (S412).

Meanwhile, if the difference in the load between two channels is lower than the third set point value when the line of the mobile communication terminal is busy. it proceeds to the next step of measuring the load of each available channel (S409). Also, the first to third set point values are designated by an operator of the mobile communication system and stored in EMS.

Although the invention has been described with reference to particular embodiments, the description is only an example of the invention's application and should not be taken as limiting. Various adaptations and combinations of features of the embodiments disclosed are within the scope of the invention as defined by the following claims.

INDUSTRIAL APPLICABILITY

The present invention relates to a channel allocation method in a mobile communication system. More specifically, the present invention relates to a channel allocation method in the asynchronous mobile communication system to uniformly distribute calls to channels.

The invention claimed is:
1. A channel allocation method comprising steps of:
measuring periodically a load of each available channel and a difference of the load between two available channels;
receiving a message requesting a signal bearer setting from a mobile communication terminal through a connected channel;
when the message requesting the signal bearer is received, checking whether the difference in the load between the connected channel and another channel exceeds a first set point value;
converting the connected connection of the mobile communication terminal to the another channel if the difference in the load exceeds the first set point value;
receiving a message requesting a traffic bearer setting from the mobile communication terminal through the connected channel;

when the message requesting the traffic bearer is received, checking whether the difference in the load between the connected channel and another channel exceeds a second set point value;

converting the connected connection of the mobile communication terminal to the another channel if the difference in the load exceeds the second set point value;

providing data to the mobile communication terminal through one of the connected channel and the another channel;

checking whether a difference in the load between the channel providing the data and another channel exceeds a third set point value;

selecting at least one mobile communication terminal among a plurality of mobile communication terminals connected to the channel providing the data if the difference in the load exceeds the third set point value; and converting the connected channel of the selected at least one mobile communication terminal to the another channel if the difference in the load exceeds the third set point value.

2. The channel allocation method as claimed in claim 1, wherein the load of said each available channel is measured based on an output power of a signal transmitting apparatus in case of a downward link, and in case of an upward link, the load of said each available channel is measured based on a total interference amount comprised in a signal transmitted to the signal transmitting apparatus.

3. The channel allocation method as claimed in claim 1, wherein the first set point value is stored in an EMS (Element Management System) connected to a node B/RNC, and established by an EMS manager.

4. The channel allocation method as claimed in claim 1, wherein the first set point value is set differently according to the type of said bearer.

5. The channel allocation method as claimed in claim 1, wherein the second set point value is stored in an EMS (Element Management System) connected to a node B/RNC, and set by an EMS manager.

* * * * *